(12) United States Patent
Drozdova et al.

(10) Patent No.: US 10,147,019 B2
(45) Date of Patent: Dec. 4, 2018

(54) SMALL OBJECT DETECTION

(71) Applicant: SAP SE, Walldorf (DE)

(72) Inventors: Iuliia Drozdova, Hadera (IL); Leonid Bobovich, Ra'anana (IL); Michael Kemelmakher, Hod Hasharon (IL); Ilia Rutenburg, Ayanot (IL); Ran Moshe Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/463,673

(22) Filed: Mar. 20, 2017

(65) Prior Publication Data

US 2018/0268250 A1 Sep. 20, 2018

(51) Int. Cl.
*G06K 9/62* (2006.01)
*G06K 9/46* (2006.01)

(52) U.S. Cl.
CPC ......... *G06K 9/6215* (2013.01); *G06K 9/4604* (2013.01); *G06K 9/6267* (2013.01)

(58) Field of Classification Search
None
See application file for complete search history.

(56) References Cited

U.S. PATENT DOCUMENTS

| 9,864,912 | B2 * | 1/2018 | Min | G06K 9/00718 |
| 2015/0186742 | A1 * | 7/2015 | Murray | G06K 9/4676 382/190 |
| 2015/0278642 | A1 * | 10/2015 | Chertok | G06N 3/02 382/156 |
| 2016/0328630 | A1 * | 11/2016 | Han | G06K 9/6272 |
| 2017/0169313 | A1 * | 6/2017 | Choi | G06K 9/6267 |
| 2017/0262735 | A1 * | 9/2017 | Ros Sanchez | G06K 9/6256 |
| 2017/0270653 | A1 * | 9/2017 | Garnavi | G06T 7/0002 |
| 2017/0300785 | A1 * | 10/2017 | Merhav | G06K 9/6257 |
| 2017/0308770 | A1 * | 10/2017 | Jetley | G06K 9/6256 |

(Continued)

FOREIGN PATENT DOCUMENTS

| WO | WO 2017015947 A1 * | 2/2017 | G06T 7/246 |
| WO | WO 2017132830 A1 * | 8/2017 | G06K 9/00 |
| WO | WO 2017158575 A1 * | 9/2017 | G06F 15/00 |

OTHER PUBLICATIONS

Girshick, Ross, et al. "Rich feature hierarchies for accurate object detection and semantic segmentation." arXiv preprint arXiv:1311.2524 (2013).

(Continued)

*Primary Examiner* — Delomia L Gilliard
(74) *Attorney, Agent, or Firm* — Mintz Levin Cohn Ferris Glovsky and Popeo, P.C.

(57) ABSTRACT

In one respect, there is provided a system that may include a processor and a memory. The memory may be configured to store instructions that results in operations when executed by the processor. The operations may include: generating a concatenated feature map set by at least combining a first feature map set and a second feature map set, the first feature map set and the second feature map set each indicating one or more occurrences of a feature within an image, the first feature map set having a different scale than the second feature map set; and classifying, by a convolutional neural network, an image, the classifying of the image being based at least on the concatenated feature map set. Related methods and articles of manufacture are also disclosed.

16 Claims, 7 Drawing Sheets

(56) References Cited

U.S. PATENT DOCUMENTS

2017/0337466 A1* 11/2017 Bayat ..................... G06F 3/061
2018/0068198 A1*  3/2018 Savvides .............. G06K 9/3233
2018/0082179 A1*  3/2018 Gredilla .................. G06N 3/08

OTHER PUBLICATIONS

Girshick, Ross. "Fast R-CNN." arXiv preprint arXiv:1504.08083 (2015).
Hoang Ngan Le, T., et al. "Multiple Scale Faster-RCNN Approach to Driver's Cell-Phone Usage and Hands on Steering Wheel Detection." Proceedings of the IEEE Conference on Computer Vision and Pattern Recognition Workshops. 2016.
Ouyang, Wanli, et al. "Deepid-net: multi-stage and deformable deep convolutional neural networks for object detection." arXiv preprint arXiv:1409.3505 (2014).
Redmon, Joseph, et al. "You Only Look Once: Unified, Real-Time Object Detection." arXiv preprint arXiv:1506.02640 (2015).
Ren, Shaoqing, et al. "Faster R-CNN: Towards Real-Time Object Detection with Region Proposal Networks." arXiv preprint arXiv:1506.01497 (2015).

* cited by examiner

SMALL OBJECT DETECTION

FIELD

The present disclosure generally relates to machine learning and, more specifically, to the optimization of small object detection by a machine learning model.

BACKGROUND

Machine learning models, such as convolutional neural networks, may be trained to perform a variety of cognitive tasks including, for example, image classification and speech recognition. For instance, a convolutional neural network may classify an image by at least processing the image through a plurality of layers including, for example, one or more convolution layers and pooling layers. Each convolution layer may apply, to the image, weights that are configured to detect the presence of various features in the image. A convolution layer that follows another convolution layer may have weights that detect more complex features than the preceding convolution layer. Meanwhile, a pooling layer may be configured remove noise from the features detected by one or more preceding convolution layers.

SUMMARY

Methods, systems, and articles of manufacture, including computer program products, are provided for small object detection. In some implementations of the current subject matter, there is provided a system. The system can include at least one processor and at least one memory. The at least one memory can include program code that provides operations when executed by the at least one processor. The operations can include: generating a concatenated feature map set by at least combining a first feature map set and a second feature map set, the first feature map set and the second feature map set each indicating one or more occurrences of a feature within an image, and the first feature map set having a different scale than the second feature map set; and classifying, based at least on the concatenated feature map set, the image.

In some variations, the first feature map set may include a first plurality of feature maps and the second feature map set may include a second plurality of feature maps. The second feature map set may be generated by at least applying a pooling function to the first feature map set, the application of the pooling function removing at least some of a plurality of feature maps present in the first feature map set. The pooling function may be a max pooling function and/or an average pooling function. The second feature map set may be a deconvoluted feature map set. The second feature map set may be generated by at least deconvoluting a third feature map set.

In some variations, the first feature map set may be generated by applying, to the image, one or more weights configured to detect the one or more occurrences of the feature within the image. The classifying of the image may be performed by a convolutional neural network. At least one of the first feature map set and the second feature map set may be generated by a convolution layer and/or a pooling layer of the convolutional neural network.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
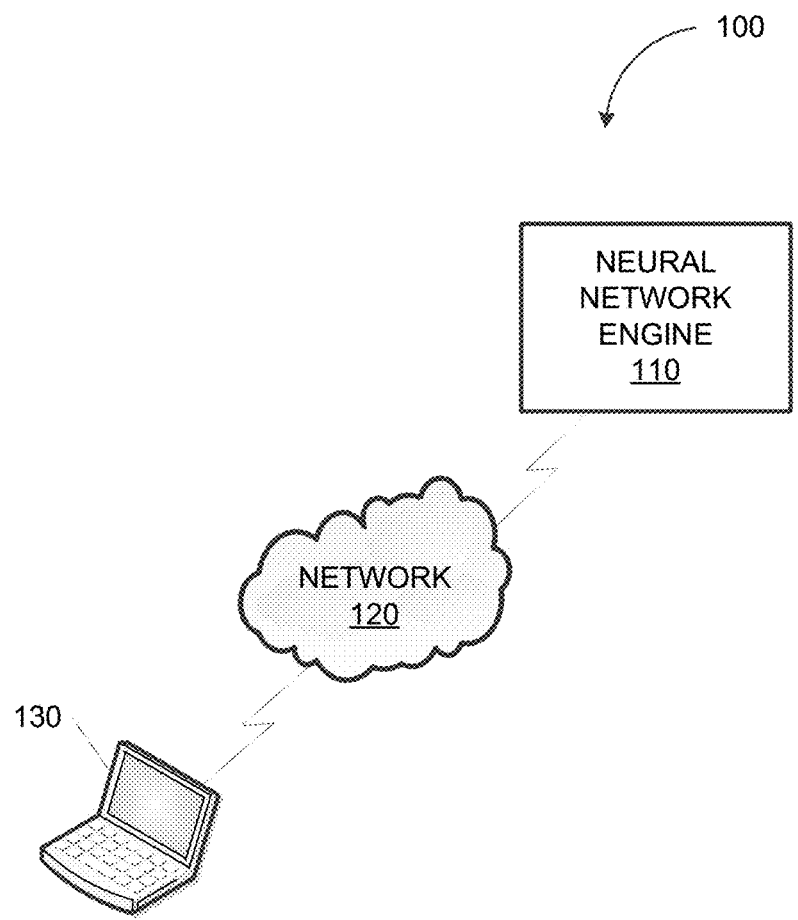
FIG. 1 depicts a network diagram illustrating a network environment, in accordance with some example embodiments.

Like labels are used to refer to same or similar items in the drawings.

DETAILED DESCRIPTION

A convolutional neural network may classify an image by processing the image through multiple layers of the convolutional neural network including, for example, one or more convolution layers and pooling layers. As noted above, a convolution layer may apply one or more weights to an image in order to detect the presence of various features across the image. Moreover, applying the one or more weights to detect a particular feature in an image may generate a corresponding feature map indicating the occurrences of that feature within the image. A subsequent pooling layer may remove noise from the feature map by at least compressing the feature map in the feature map set. The compression performed at the pooling layer may minimize and/or remove at least some of the feature maps in a feature map set. In particular, the operations of the pooling layer may obscure and/or eliminate small objects depicted in the image, thereby preventing the convolutional neural network from detecting and identifying these small objects.

In some example embodiments, a convolutional neural network may include a concatenation layer configured to generate a concatenated feature map set. The concatenated feature map set may be generated based on a plurality of pooled feature map sets (e.g., output by one or more preceding pooling layers in the convolutional neural network). Meanwhile, the plurality of pooled feature map sets may include pooled feature maps having different scales or dimensions. For instance, a convolutional neural network may classify an image by at least generating (e.g., through convoluting and/or pooling) a first feature map set. The first feature map set may have a first scale while pooling the first feature map set (e.g., at a pooling layer) may generate a second feature map set having a second scale that is smaller than the first scale. Pooling the first feature map set may obscure and/or eliminate, from the second feature map set, smaller features appearing in the image. As such, the concatenated feature map set may be generated by combining features present in the first feature map set and the second feature map set, thereby restoring at least some of the smaller feature maps obscured and/or eliminated as a result of pooling the first feature map set. The classification of the image may be determined based on the concatenated feature map set, which may enable the convolutional neural network to detect and/or identify at least some of the smaller objects present in the image.

In some example embodiments, a concatenated feature map set may be generated from at least one deconvoluted feature map set. For instance, a pooled feature map set may be generated by at least applying, to the feature map set, a pooling function. Meanwhile, a deconvoluted feature map set may be generated from the pooled feature map set by at least applying a corresponding inverse or unpooling function. Specifically, a pooling function, such as a max pooling function and/or an average pooling function, may be applied to an image in which one or more weights may have been applied to detect one or more occurrences of a particular feature. Applying one or more weights to a portion of an image may trigger a response that corresponds a proximity of the match between the feature being detected and the contents of that portion of the image. Here, applying a max pooling function may select only those features triggering the highest response across individual portions of the image. Alternately and/or additionally, applying an average pooling function may determine an average response across individual portions of the image. As such, application of the pooling function (e.g., max pooing function and/or average pooling function) may generate a pooled feature map set in which at least some occurrences of the feature present in the image are not detected. Thus, according to some example embodiments, generating the deconvoluted feature map set may include up-sampling the pooled feature map set by at least reversing the max pooling function and/or the average pooling function, thereby restoring at least some of the feature maps that were removed due to the application of the max pooling function and/or the average pooling function. For example, in some example embodiments, a deconvoluted feature map set may be generated by applying, to a pooled feature map set, an unpooling function that approximates the inverse of the max pooling function originally applied to generate the pooled feature map set. It should be appreciated that a max pooling function is generally nonreversible. However, the unpooling function may generate an approximation of the inverse of a max pooling function by recording the locations of the maxima within each pooling region in a set of switch variables. The switch variables may be used to place the reconstructions from a preceding pooling layer to appropriate locations, thereby preserving the structure of the stimulus.

FIG. 1 depicts a network diagram illustrating a network environment 100, in accordance with some example embodiments. Referring to FIG. 1, a neural network engine 110 may be communicatively coupled, via a wired and/or wireless network 120, to client device 130. The wired and/or wireless network 120 can be a wide area network (WAN), a local area network (LAN), and/or the Internet.

In some example embodiments, the neural network engine 110 may be configured to implement one or more machine learning models including, for example, a convolutional neural network. As such, the neural network engine 110 may be trained to serve as, for example, an image classifier. According to some example embodiments, the neural network engine 110 may implement a convolutional neural network that includes a concatenation layer. The concatenation layer may generate one or more concatenated feature map sets that may be used in classifying an image. It should be appreciated that classifying an image based on a concatenated feature map set (e.g., instead of a pooled feature map) may enable the convolutional neural network to detect and/or identify small objects present the image. Small objects, which are relatively small in size compared to other objects in an image, are typically obscured and/or eliminated due to the operations of the pooling layers of the convolutional neural network. Generating a concatenated feature map set may enable the detection of small objects in the image by restoring at least some of the small objects that have been obscured and/or eliminated due to the operations of the pooling layers of the convolutional neural network.

In some example embodiments, the client device 130 may provide a user interface for interacting with the neural network engine 110. For example, a user may provide, via the client device 130, one or more training sets, validation sets, and/or production sets for processing by the neural network engine 110. Alternately and/or additionally, the user may provide, via the client device 130, one or more configurations for the neural network engine 110 including, for example, hyper parameters such as a stride size that is used by the neural network engine 110 when processing the one or more training sets, validation sets, and/or production sets. The user may further receive, via the client device 130, outputs from the neural network engine 110 including, for example, a result of the processing of the one or more training sets, validation sets, and/or production sets.

In some example embodiments, the functionalities of the neural network engine 110 may be accessed (e.g., by the client device 130) as a remote service (e.g., a cloud application) via the network 120. For instance, the neural network engine 110 may be deployed at one or more separate remote platforms. Alternately and/or additionally, the neural network engine 110 may be deployed (e.g., at the client device 130) as computer software and/or dedicated circuitry (e.g., application specific integrated circuits (ASICs)).

Figure 2A:
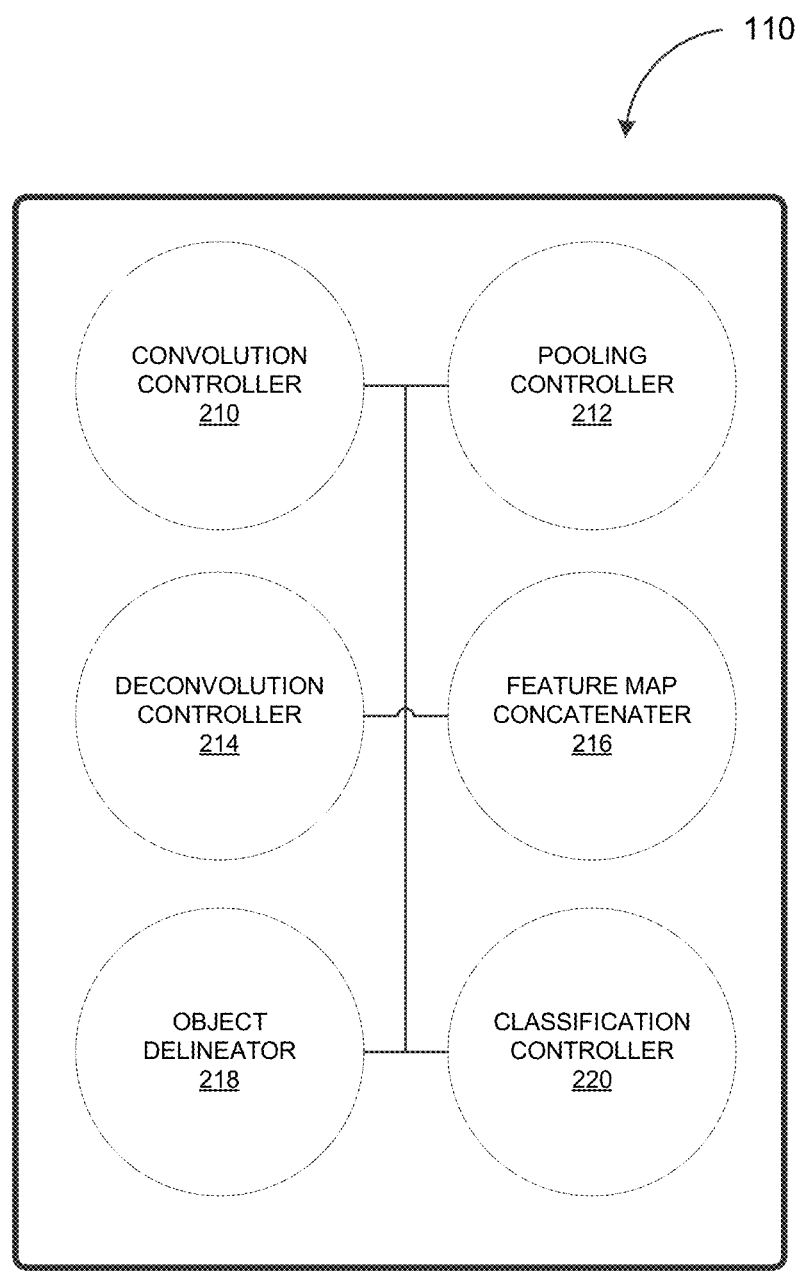
FIG. 2A depicts a block diagram illustrating a neural network engine, in accordance with some example embodiments.

FIG. 2A depicts a block diagram illustrating the neural network engine 110, in accordance with some example embodiments. Referring to FIGS. 1 and 2A, the neural network engine 110 may include a convolution controller 210, a pooling controller 212, a deconvolution controller 214, a feature map concatenater 216, an object identifier 218, and a classification controller 220. It should be appreciated that the neural network engine 110 may include additional and/or different components.

In some example embodiments, the convolution controller 210 may implement one or more convolution layers in a convolutional neural network (e.g., implemented by the neural network engine 110). As such, in order for the convolutional neural network to process and classify an image, the convolution controller 210 may apply one or more weights (e.g., a weight matrix) to the image. The weights may be configured to detect a particular feature that is present in the image. Table 1 below illustrates a weight matrix configured to detect the occurrences of diagonal lines or edges within an image. Thus, applying the weight matrix to a portion of the image may include computing a dot product between the weight matrix and the pixel values present in that portion of the image. Computing the dot product may generate a response that corresponds to the proximity of a match between the feature being detected and the contents appearing in that portion of the image. Furthermore, applying the weight matrix to the image may generate a corresponding feature map set that indicates various occurrences of the feature within the image.

TABLE 1

$$\begin{bmatrix} 1 & 0 & 0 \\ 0 & 1 & 0 \\ 0 & 0 & 1 \end{bmatrix}$$

When the convolutional neural network includes multiple convolution layers, the convolution controller 210 may implement these convolution layers to apply weights having different granularities. For instance, the weights that are applied at one convolution layer may be configured to detect more complex, less abstract, and/or less granular features than the weights applied at a subsequent convolution layer. To further illustrate, the weights that are applied at one convolution layer may be configured to detect edges (e.g., horizontal lines, vertical lines, diagonal lines) in an image while the weights that are applied at a subsequent convolution layer may be configured to detect shapes (e.g., triangles, rectangles, circles), which may be formed from the edges detected in the previous convolution layer.

In some example embodiments, the pooling controller 212 may implement one or more pooling layers in a convolutional neural network (e.g., implemented by the neural network engine 110). As such, the pooling controller 212 may be configured to apply one or more pooling functions (e.g., max pooling function, average pooling function) to a feature map set, which may be a feature map set output by a preceding convolution layer (e.g., implemented by the convolution controller 210) and/or a preceding pooling layer (e.g., implemented by the pooling controller 212). For instance, the pooling controller 212 may be configured to apply a max pooling function, which selects those occurrences of a feature that is associated with the highest response (e.g., dot product). Alternately and/or additionally, the pooling controller 212 may be configured to apply an average pooling function, which determines the average response (e.g., dot product) across various portions of the image. It should be appreciated that applying a pooling function, such as a max pooling function and/or average pooling function, may remove at least some feature map from a resulting pooled feature map set. As such, applying a pooling function to a first feature map set may generate a second feature map set (e.g., a pooled feature map set) that has a smaller scale than the first feature map set.

In some example embodiments, the deconvolution controller 214 may implement one or more deconvolution layers in a convolutional neural network (e.g., implemented by the neural network engine 110). As such, the deconvolution controller 214 may be configured to reverse the operations of one or more preceding convolution layers (e.g., implemented by the convolution controller 210) and/or preceding pooling layers (e.g., implemented by the pooling controller 212). For example, a pooled feature map set may be generated by applying a pooling function (e.g., max pooling function, average pooling function) to an image. To generate a corresponding deconvoluted feature map set may include applying an inverse or unpooling function to the pooled feature map set. The application of the inverse function may reverse the operations of the pooling function and restore at least some of the feature maps that were removed due to the application of the pooling function.

In some example embodiments, the feature map concatenater 216 may implement a concatenation layer of the convolutional neural network (e.g., implemented by the neural network engine 110). Thus, the feature map concatenater 216 may be configured to generate a concatenated feature map set by combining two or more feature map sets. For instance, the feature map concatenater 216 may generate a concatenated feature map set by combining a plurality of convoluted feature map sets, pooled feature map sets, and/or deconvoluted feature map sets.

According to some example embodiments, the feature map concatenater 216 may be configured to generate a concatenated feature map set by combining two or more feature map sets having different scales or dimensions. For instance, the feature map concatenater 216 may generate a concatenated feature map set by combining a first feature map set having a first scale and a second feature map set having a second scale. The second feature map set may be generated (e.g., by the pooling controller 212) by applying a pooling function to the first feature map set. As such, the second feature map set may have a smaller scale than the first feature map set. In particular, at least some of the feature maps present in the first feature map set may have been removed, through application of the pooling function, in order to generate the second feature map set. Combining the first feature map set and the second feature map set may restore at least some of the feature maps that had been removed by the pooling operation.

In some example embodiments, the object delineator 218 may be configured to delineate objects that are present in a feature map set including, for example, a concatenated feature map set (e.g., generated by the feature map concatenater 216). According to some example embodiments, the object delineator 218 may delineate an object present in an image by at least determining a bounding box for the object. Table 2 below depicts an example of a bounding box. The bounding box for the object may define the minimum and maximum coordinates of the object.

TABLE 2

$P_0 = <\min_i\{v_x^i\}, \min_i\{v_y^i\}>;\ P_1 = <\min_i\{v_x^i\}, \max_i\{v_y^i\}>;$
$P_2 = <\max_i\{v_x^i\}, \max_i\{v_y^i\}>;\ P_3 = <\max_i\{v_x^i\}, \min_i\{v_y^i\}>;$
$P_4 = <\max_i\{v_x^i\}, \min_i\{v_y^i\}>;\ P_5 = <\max_i\{v_x^i\}, \max_i\{v_y^i\}>;$
$P_6 = <\min_i\{v_x^i\}, \max_i\{v_y^i\}>;\ P_7 = <\min_i\{v_x^i\}, \min_i\{v_y^i\}>.$ In some example embodiments, the classification controller 220 may be configured to classify an image that is being processed by a convolutional neural network (e.g., implemented by the neural network engine 110). For example, the classification controller 220 may classify an image based at least on a corresponding concatenated feature map set of the image. According to some example embodiments, the concatenated feature map set of the image may be subject to object delineation (e.g., by the object delineator 218) and/or region of interest pooling (e.g., by the pooling controller 212) prior to classification. It should be appreciated that region of interest pooling may identify portions of an image in which an object may be present. Meanwhile, the concatenated feature map set (e.g., instead of a pooled feature map set) enables the classification controller 220 to identify and/or classify small objects appearing in the image.

Figure 2B:
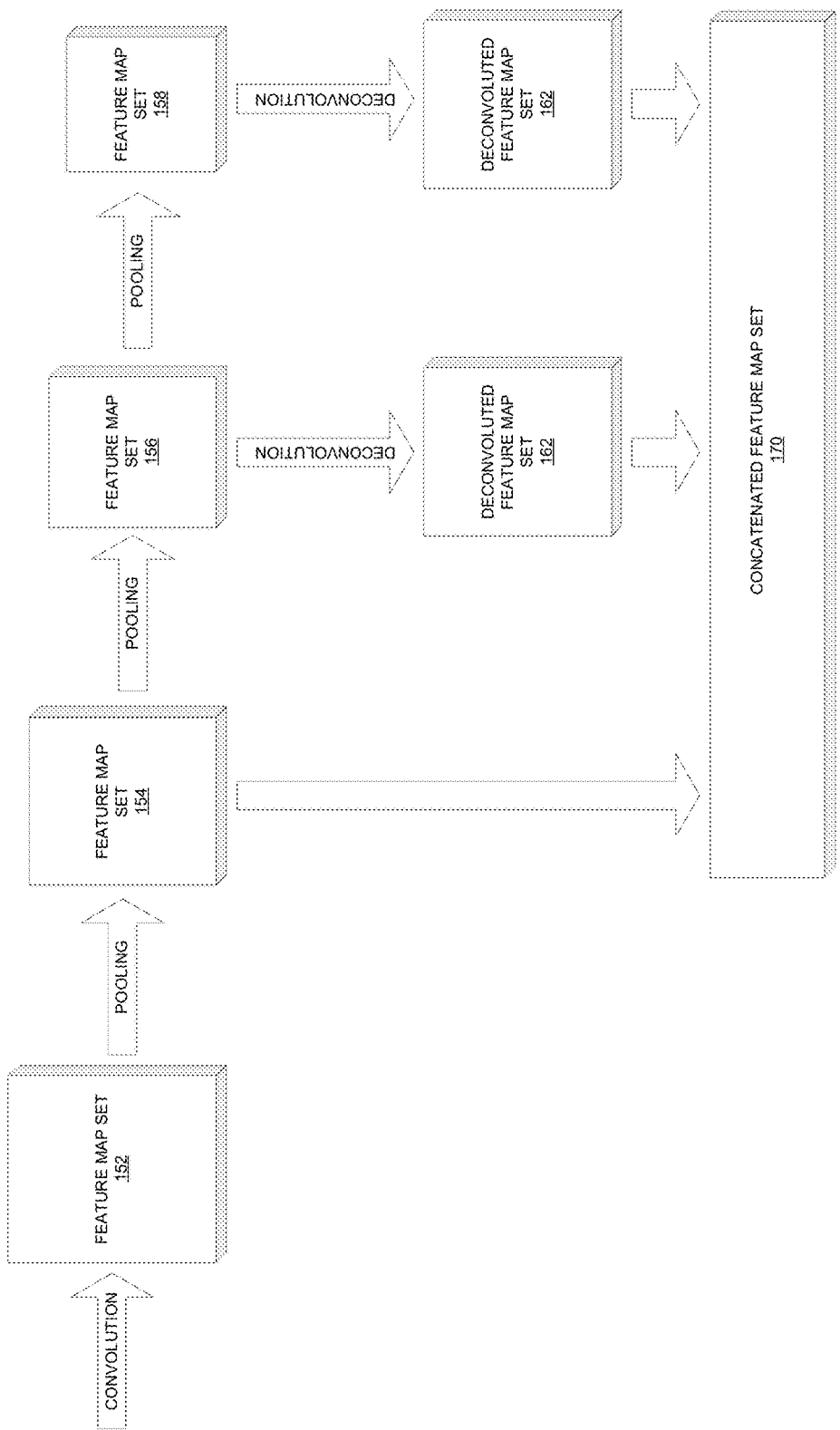
FIG. 2B depicts a block diagram illustrating a concatenated feature map set that is generated from a plurality of feature map sets, in accordance with some example embodiments.

FIG. 2B depicts a block diagram illustrating a concatenated feature map set 170 that is generated from a plurality of feature map sets, in accordance with some example embodiments. Referring to FIGS. 1 and 2A-B, the neural network engine 110 may generate a plurality of feature map sets including, for example, a first feature map set 152, a second feature map set 154, a third feature map set 156, and/or a fourth feature map set 158. The neural network engine 110 (e.g., the convolution controller 210) may generate the first feature map set 152 by at least applying, to an image, one or more weights configured to detect the presence of a feature in the first feature map set 152. As such, the first feature map set 152 may indicate one or more occurrences of the feature within the image. Meanwhile, the neural network engine 110 (e.g., the pooling controller 212) may generate the second feature map set 154 by at least applying a pooling function (e.g., max pooling function, average pooling function) to the first feature map set 152. The third feature map set 156 may be generated by at least applying a pooling function to the second feature map set 154 while the fourth feature map set 158 may be generated by applying a pooling function to the third feature map set 156.

As noted earlier, the application of a pooling function (e.g., max pooling function, average pooling function) to a feature map set may remove one or more features maps from the feature map set. Thus, the resulting feature map set may have a smaller scale or dimension than the original feature map set. To further illustrate, the second feature map set 154, which is generated by applying a pooling function to the first feature map set 152, may have a smaller scale than the first feature map set 150. Similarly, the third feature map set 156 may have a smaller scale than the second feature map set 154 while the fourth feature map set 158 may have a smaller scale than the third feature map set 156. According to some example embodiments, the concatenated feature map set 170 may be generated by at least combining feature map sets having different scales (e.g., the second feature map set 154, the third feature map set 156, and/or the fourth feature map set 158), which may restore at least some of the feature maps that were eliminated as a result of earlier pooling operations.

In some example embodiments, the neural network engine 110 (e.g., the feature map concatenater 216) may generate a concatenated feature map set that includes at least one deconvoluted feature map set. Referring again to FIG. 2B, prior to combining the third feature map set 156 and/or the fourth feature map set 158 to generate the concatenated feature map set 170, the neural network engine 110 (e.g., the deconvolution controller 214) may deconvolute the third feature map set 156 (e.g., by applying an inverse pooling function) to generate a first deconvoluted feature map set 162. Alternately and/or additionally, the neural network engine 110 (e.g., the deconvolution controller 214) may deconvolute the fourth feature map set 158 to generate a second deconvoluted feature map set 164. As shown in FIG. 2B, the neural network engine 110 (e.g., the feature map concatenater 216) may generate the concatenated feature map set 170 by at least combining, with the second feature map set 154, the first deconvoluted feature map set 162 and/or the second deconvoluted feature map set 164.

Figure 3A:
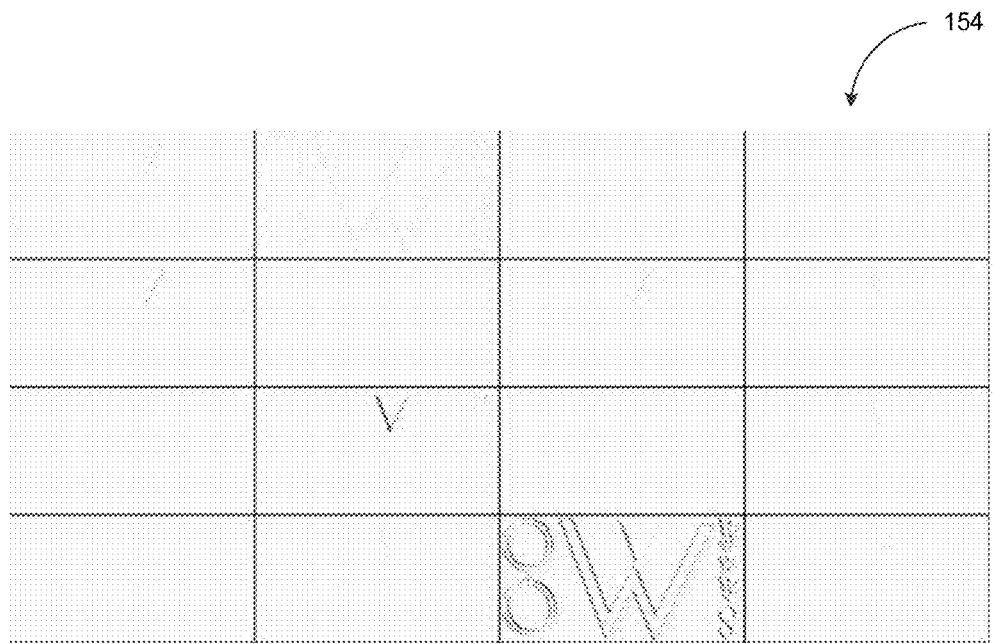
FIG. 3A depicts a feature map set, in accordance with some example embodiments.

FIG. 3A depicts the second feature map set 154, in accordance with some example embodiments. Referring to FIGS. 2B and 3A, the feature map set 154 may include a plurality of feature maps. These feature maps may be pooled feature maps that are generated (e.g., by the pooling controller 212) by at least applying a pooling function (e.g., max pooling function, average pooling function) to another feature map set, such as the first feature map set 152. Thus, the second feature map set 154 may include a pooled feature map set that has a different (e.g., smaller) scale than the original feature map set (e.g., the first feature map set 152) used to generate the pooled feature map set.

Figure 3B:
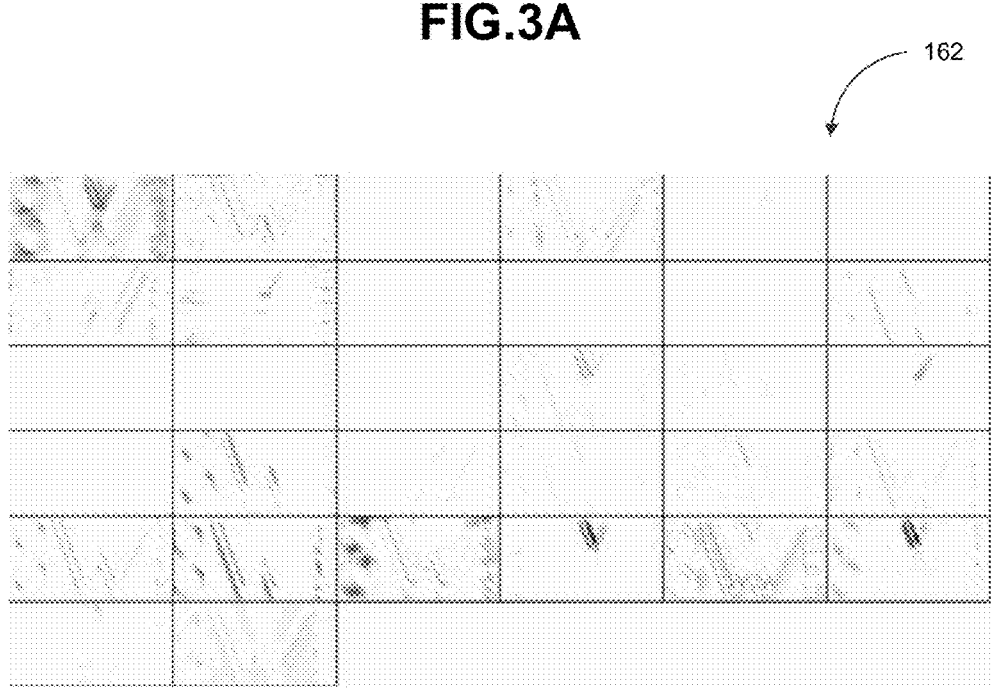
FIG. 3B depicts a feature map set, in accordance with some example embodiments.

FIG. 3B depicts the first deconvoluted feature map set 162, in accordance with some example embodiments. Referring to FIGS. 2B and 3B, the first deconvoluted feature map set 162 may include a plurality of deconvoluted feature maps. These feature maps may be generated (e.g., by the deconvolution controller 214) by at least deconvoluting another feature map set, such as the third feature map set 156. Meanwhile, the third feature map set 156 may, in turn, be generated (e.g., by the pooling controller 212) by at least applying a pooling function (e.g., max pooling function, average pooling function) to the second feature map set 154 and may thus have a different (e.g., smaller) scale than the second feature map set 154.

Figure 3C:
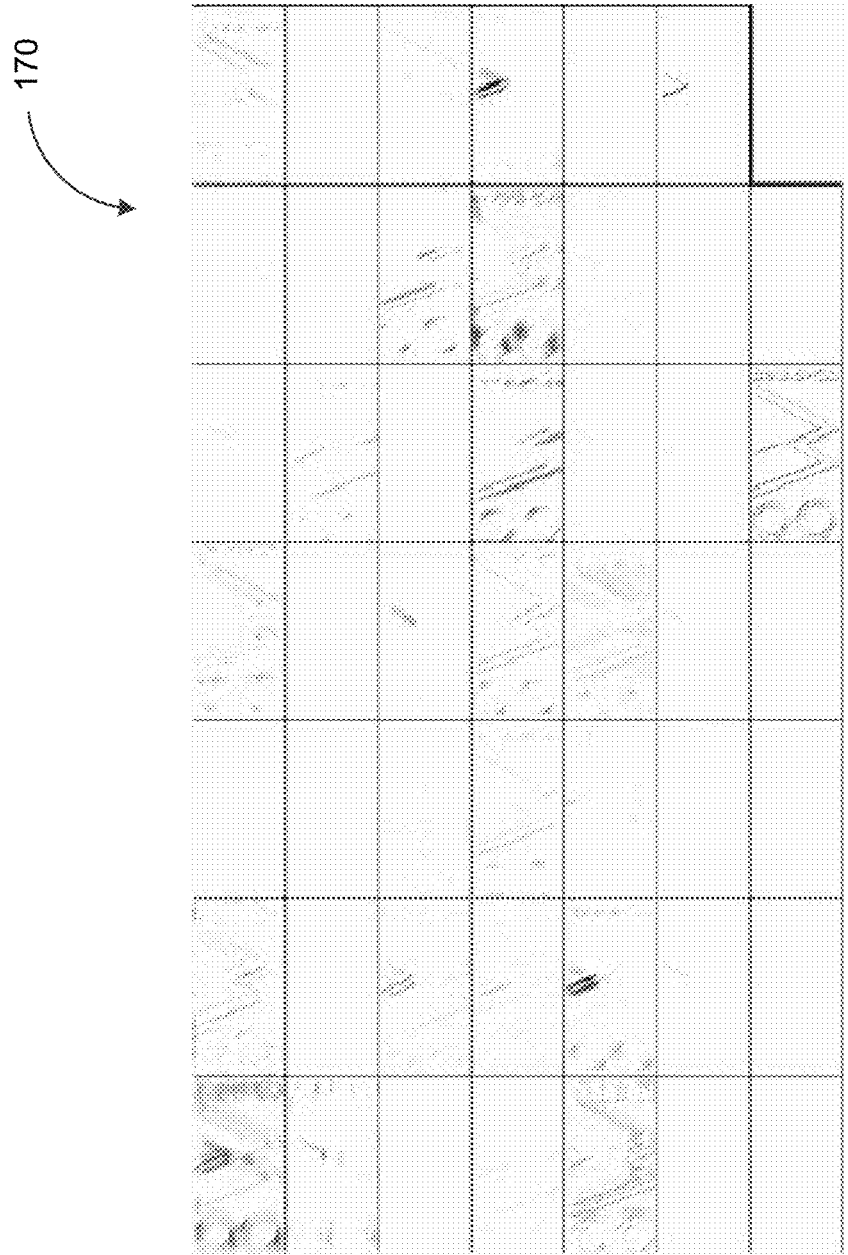
FIG. 3C depicts a concatenated feature map set, in accordance with some example embodiments.

FIG. 3C depicts a concatenated feature map set 170, in accordance with some example embodiments. Referring to FIGS. 2B and 3A-C, the concatenated feature map set 170 may include a plurality of feature map sets including, for example, the second feature map set 154 and the first deconvoluted feature map set 162. The concatenated feature map set 170 may be generated (e.g., by the feature map concatenater 216) by at least combining the second feature map set 154 and the first deconvoluted feature map set 162. It should be appreciated that combining the second feature map set 154 and the first deconvoluted feature map set 162 may restore at least some of the feature maps that are removed as a result of the pooling operations that generated the second feature map set 154.

Figure 4:
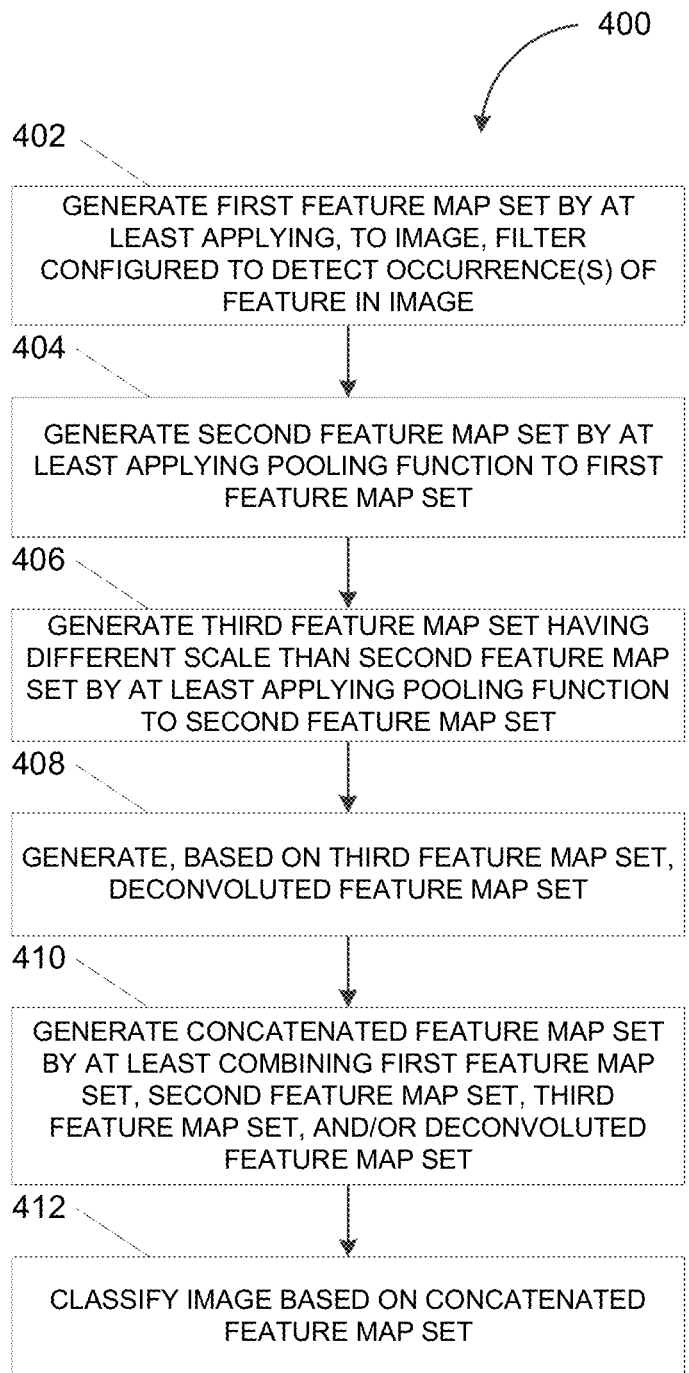
FIG. 4 depicts a flowchart illustrating a process for processing an image with a convolutional neural network, in accordance with some example embodiments.

FIG. 4 depicts a flowchart illustrating a process 400 for processing an image with a convolutional neural network, in accordance with some example embodiments. Referring to FIGS. 1, 2A-B, 3A-B, and 4, the process 400 may be performed by the neural network engine 110.

The neural network engine 110 may generate a first feature map set by at least applying, to an image, one or more weights configured to detect one or more occurrences of a feature in the image (402). For example, the neural network engine 110 (e.g., the convolution controller 210) may generate the first feature map set 152 by at least applying a weight matrix to an image.

The neural network engine 110 may generate a second feature map set by at least applying a pooling function to the first feature map set (404). For example, the neural network engine 110 (e.g., the pooling controller 212) may generate the second feature map set 154 by at least applying a pooling function (e.g., max pooling function, average pooling function) to the first feature map set 152. Applying the pooling function may remove at least some the feature maps present in the first feature map set 152 to generate the second feature map set 154. Accordingly, the second feature map set 154 may have a different (e.g., smaller) scale or dimension than the first feature map set 152.

The neural network engine 110 may generate a third feature map set having a different scale than the second feature map set by at least applying a pooling function to the second feature map set (406). For example, the neural network engine 110 (e.g., the pooling controller 212) may generate the third feature map set 156 by at least applying a pooling function (e.g., max pooling function, average pooling function) to the second feature map set 154. Applying the pooling function may remove at least some of the feature maps present in the second feature map set 154 to generate the third feature map set 156. Thus, the third feature map set

156 may have a different (e.g., smaller) scale or dimension than the second feature map set 154.

The neural network engine 110 may generate, based on the third feature map set, a deconvoluted feature map set (408). For example, the neural network engine 110 (e.g., the deconvolution controller 214) may generate the first deconvoluted feature map set 162 by at least applying, to the third feature map set 156, an inverse pooling function configured to reverse the pooling function (e.g., max pooling function, average pooling function) that was applied to the third feature map set 156. Applying the inverse pooling function may restore at least some of the feature maps that were removed in order to generate the third feature map set 156.

The neural network engine 110 may generate a concatenated feature map set by at least combining one or more of the first feature map set, second feature map set, third feature map set, and the deconvoluted feature map set (410). For instance, the neural network engine 110 (e.g., the feature map concatenater 216) may generate concatenated feature map set 170 by at least combining the second feature map set 154 and the third feature map set 156. As such, the concatenated feature map set 170 may include features from both the second feature map set 154 and the third feature map set 156.

The neural network engine 110 may classify the image based at least on the concatenated feature map set (412). For example, the neural network engine 110 (e.g., the classification controller 220 may classify an image based on the concatenated feature map set 170. In some example embodiments, the neural network engine 110 (e.g., the object delineator 218) may delineate objects present in the concatenated feature map set 170 by at least computing one or more bounding boxes defining the minimum and maximum coordinates of these objects. Alternately and/or additionally, the neural network engine 110 may perform region of interest pooling on the concatenated feature map set 170. The classification of the image may be determined based on the delineation of the objects (e.g., in the concatenated feature map set 170) and/or the concatenated feature map set 170 subsequent to region of interest pooling.

Figure 5:
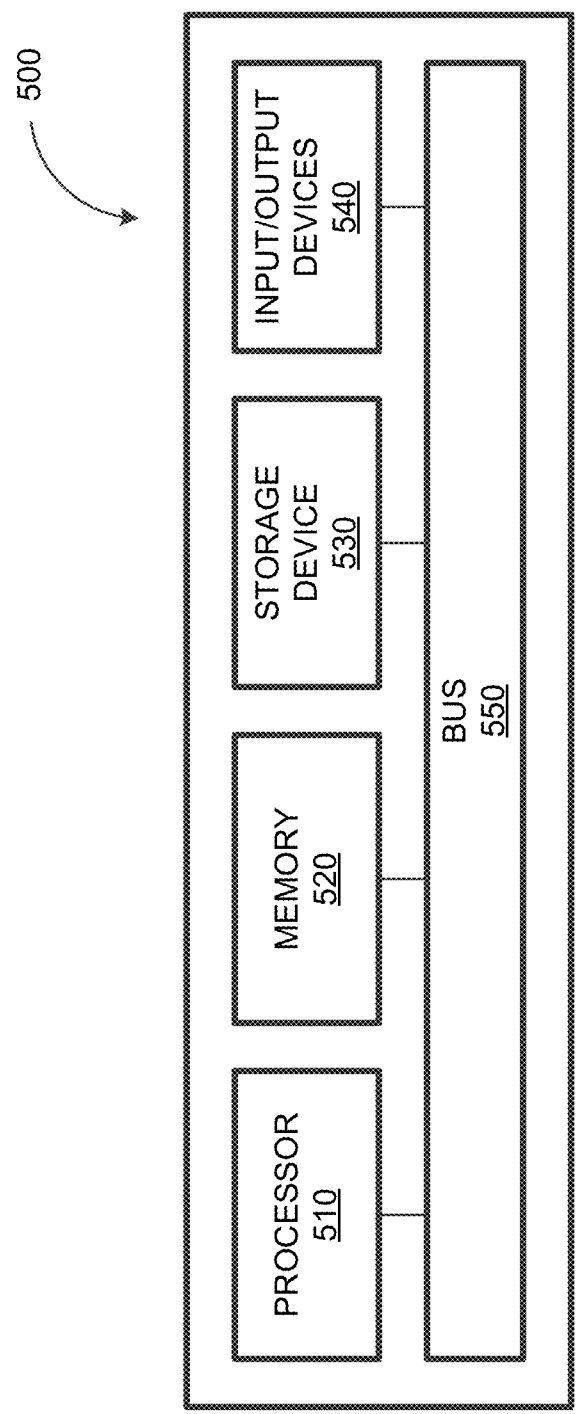
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the neural network engine 110, the client device 130, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the neural network engine 110 and/or the client device 130. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   generating a concatenated feature map set by at least combining a first feature map set and a second feature map set, the first feature map set and the second feature map set each indicating one or more occurrences of a feature within an image, the second feature map set generated by at least applying a pooling function to the first feature map set, the application of the pooling function removes, from the first feature map set, at least one feature map such that the second feature map has a different scale than the first feature map set, the combining of the first feature map set and the second feature map set restores the at least one feature map removed from the first feature map set, and the concatenated feature map set including the at least one feature map restored by the combining of the first feature map and the second feature map; and
   classifying, based at least on the concatenated feature map set, the image.

2. The system of claim 1, wherein the first feature map set includes a first plurality of feature maps and the second feature map set includes a second plurality of feature maps.

3. The system of claim 1, wherein the pooling function comprises a max pooling function and/or an average pooling function.

4. The system of claim 1, further comprising:
   deconvoluting the second feature map set prior to combining the second feature map set and the first feature map set.

5. The system of claim 4, wherein the deconvoluting of the second feature map set comprises applying, to the second feature map set, an inverse of the pooling function.

6. The system of claim 1, wherein the first feature map set is generated by applying, to the image, one or more weights configured to detect the one or more occurrences of the feature within the image.

7. The system of claim 1, wherein the classifying of the image is performed by a convolutional neural network.

8. The system of claim 7, wherein at least one of the first feature map set and the second feature map set is generated by a convolution layer and/or a pooling layer of the convolutional neural network.

9. A computer-implemented method, comprising:
   generating a concatenated feature map set by at least combining a first feature map set and a second feature map set, the first feature map set and the second feature map set each indicating one or more occurrences of a feature within an image, the second feature map set generated by at least applying a pooling function to the first feature map set, the application of the pooling function removes, from the first feature map set, at least one feature map such that the second feature map has a different scale than the first feature map set, the combining of the first feature map and the second feature map restores the at least one feature map removed from the first feature map set, and the concatenated feature map including the at least one feature map restored by the combining of the first feature map and the second feature map; and
   classifying, based at least on the concatenated feature map set, the image.

10. The computer-implemented method of claim 9, wherein the first feature map set includes a first plurality of feature maps and the second feature map set includes a second plurality of feature maps.

11. The computer-implemented method of claim 9, wherein the pooling function comprises a max pooling function and/or an average pooling function.

12. The computer-implemented method of claim 9, further comprising:

deconvoluting the second feature map set prior to combining the second feature map set and the first feature map set.

13. The computer-implemented method of claim 12, wherein the deconvoluting of the second feature map set comprises applying, to the second feature map set, an inverse of the pooling function.

14. The computer-implemented method of claim 9, wherein the first feature map set is generated by applying, to the image, one or more weights configured to detect the one or more occurrences of the feature within the image.

15. The computer-implemented method of claim 9, wherein the classifying of the image is performed by a convolutional neural network.

16. A non-transitory computer-readable storage medium including program code, which when executed by at least one data processor, cause operations comprising:
   generating a concatenated feature map set by at least combining a first feature map set and a second feature map set, the first feature map set and the second feature map set each indicating one or more occurrences of a feature within an image, the second feature map set generated by at least applying a pooling function to the first feature map set, the application of the pooling function removes, from the first feature map set, at least one feature map such that the second feature map has a different scale than the first feature map set, the combining of the first feature map and the second feature map restores the at least one feature map removed from the first feature map set, and the concatenated feature map including the at least one feature map restored by the combining of the first feature map and the second feature map; and
   classifying, based at least on the concatenated feature map set, the image.

* * * * *